Patented Jan. 2, 1940

2,185,183

UNITED STATES PATENT OFFICE 2,185,183

THIOCYANO-ALKYL ETHERS OF ALKYLPHENOLS

Gerald H. Coleman and Clarence L. Moyle, Midland, Mich., assignors to The Dow Chemical Company, Midland, Mich., a corporation of Michigan No Drawing. Application October 26, 1938, Serial No. 237,058

13 Claims. (Cl. 260—454)

The present invention concerns a new class of compounds, namely, the thiocyano-alkyl ethers of alkylphenols, wherein the sum of the carbon atoms in the alkyl groups attached to the benzene nucleus is at least 2.

We have prepared compounds of the aforementioned class, determined certain physical properties thereof whereby they may be readily identified, and found that they are useful as insecticidal toxicants, particularly when dissolved in petroleum distillate fractions. These compounds are, for the most part, viscous, high boiling, water-white liquids substantially insoluble in water, soluble in most petroleum distillate fractions, and somewhat soluble in organic solvents generally.

Our new compounds may be prepared by reacting a halo-alkyl ether of an alkyl-phenol with an alkali metal thiocyanate in presence of alcohol. For example, a halo-alkyl ether of an alkylphenol such as beta-(4-tertiary-butyl-phenoxy)-ethyl chloride and potassium thiocyanate are dispersed in absolute alcohol and the resulting mixture heated to its boiling temperature and under reflux for a period of time sufficient to accomplish the reaction. The reaction temperature is generally between 75° and 90° C., although somewhat lower or higher temperatures may be employed, the reaction being carried out under autogenous pressure where temperatures above the boiling point of the solution prevail. While any suitable proportions of the halo-alkyl-aryl ether and thiocyanate may be employed, substantially equimolecular proportions thereof have been found to give the desired compound in good yield. The alcohol may be employed in amount sufficient to retain the reactants and final ether product in solution. Following the reaction, the major part of the alcohol solvent is removed by distillation, and the residue diluted with water, whereupon a water-immiscible layer of the thiocyano-alkyl ether of the alkylphenol separates from solution. If desired, this compound may be recovered by extraction with a suitable solvent, as benzene, the extract being fractionally distilled. In an alternate procedure the water-immiscible layer may be separated as by decantation, washed with water, and used as an insecticidal toxicant without further purification.

The halo-alkyl ethers employed as reactants in the preparation of our new compounds can be obtained by reacting suitable metal phenolates with the dihalo-aliphatic hydrocarbons under conditions of temperature and pressure that favor the replacement of a single halogen atom by the alkyl-phenoxy group. Co-pending application Serial No. 139,581, filed April 28, 1937, by Coleman et al. describes the preparation of certain of these halo-alkyl ethers.

The following examples describe in detail the preparation of a number of compounds falling within the scope of our invention, but are not to be construed as limiting the same:

Example 1

A mixture of 39 grams (0.183 mol) of beta-chloro-ethyl ether of 4-tertiarybutyl phenol (boiling point 107° to 108° C. at 2 millimeters pressure), 15.4 grams (0.19 mol) of sodium thiocyanate, and 60 grams of absolute alcohol was heated to its boiling temperature of 85° to 87° C. and under reflux for 30 hours. The mixture was then distilled to remove the major part of the alcohol solvent and the residue poured into an excess of water with stirring. A water-immiscible layer was separated from the water mixture by extraction with benzene, and the extract washed with water, dried over magnesium sulfate and fractionally distilled. 18 grams of beta-thiocyano-ethyl ether of 4-tertiarybutyl phenol was thereby obtained as a colorless liquid boiling at 158°–163° C. at 2.5 millimeters pressure and having the specific gravity 1.073 at 20°/4° C. A 3 per cent solution of this compound in kerosene, when tested by the Peet-Grady method substantially as described in Soap, 8, No. 4 (1932), gave a knockdown of 97 per cent in 10 minutes and a kill of 81 per cent in 48 hours against three-day old house flies.

Example 2

368.2 grams (1.4 mols) of beta-bromo-ethyl ether of carvacrol (boiling point 185° to 195° C. at 10 millimeters pressure), 135 grams (1.4 mols) of potassium thiocyanate, and 500 milliliters of absolute alcohol were mixed together and heated at 85° C., the refluxing temperature of the mixture, for 6 hours. The reaction mixture was thereafter cooled to room temperature, filtered to remove undissolved potassium bromide, and fractionally distilled, whereby there was obtained the beta-thiocyano-ethyl ether of carvacrol in 62 per cent yield as a pale, yellow colored oil boiling at 189° to 196° C. at 10 millimeters pressure, and having a specific gravity of 1.076 at 25°/4° C. A 3 per cent solution of this compound in kerosene, when tested according to the Peet-Grady method gave a knockdown in 10 minutes of 100 per cent and a kill in 48 hours of 92 per cent of three-day old house flies.

Example 3

A mixed sodium salt prepared from phenols obtained in the distillation of hardwood tar was reacted with ethylene bromide to form the corresponding mixed bromo-alkyl ethers. This mixed ether product was reacted with potassium thiocyanate in absolute alcohol substantially as described in Example 2. Upon fractional distillation of the crude reaction product, a mixture of beta-thiocyano-ethyl ethers of common wool phenols was obtained boiling at 190° to 195° C. at 15.3 millimeters pressure and having a specific gravity of 1.147 at 25°/4° C. A 3 per cent solution of this mixture in kerosene, when tested as described in the preceding examples, gave a knockdown in 10 minutes of 100 per cent and a kill in 48 hours of 93 per cent of three day old house flies.

Example 4

Equimolecular proportions of potassium thiocyanate and the beta-bromo-ethyl ether of a mixture of isomeric xylenols were dissolved in alcohol and reacted together as described in Example 2, to obtain the beta-thiocyano-ethyl ethers of the xylenol mixture as a pale yellow liquid boiling at 175° to 190° C. at 10 millimeters pressure and having a specific gravity of 1.142 at 25°/4° C.

In a similar manner, other halo-alkyl ethers of alkyl phenols were reacted with the alkali metal thiocyanates to obtain the corresponding thiocyano-alkyl ether compounds. The following are representative of the thiocyano-alkyl ethers obtained:

Gamma-thiocyano-propyl ether of 2,4-ditertiarybutyl phenol, a colorless liquid boiling at 173° to 175° C. at 2 millimeters pressure and having a specific gravity of 1.140 at 30°/4° C. This compound was prepared by reacting the gamma-chloro-propyl ether of 2,4-ditertiarybutyl phenol (boiling point 153° to 154° C. at 4 millimeters pressure) with potassium thiocyanate.

Beta-thiocyano-ethyl ether of thymol, a pale yellow liquid boiling at 173° to 176° C. at 5 millimeters pressure and having the specific gravity 1.062 at 25°/4° C. This compound was prepared by reacting the beta-bromo-ethyl ether of thymol (boiling point 125° to 135° C. at 5 millimeters pressure) with potassium thiocyanate. A 3 per cent solution of this compound in kerosene, when tested as described in the preceding examples gave a knockdown in 10 minutes of 100 per cent and a kill in 48 hours of 83 per cent of three-day old house flies.

Beta-thiocyano-ethyl ether of 2-methyl-4-tertiarybutyl phenol, a viscous liquid boiling at 195° to 198° C. at 10 millimeters pressure, and having a specific gravity of 1.062 at 25°/4° C. This compound was prepared by reacting the beta-bromo-ethyl ether of 2-methyl-4-tertiarybutyl phenol (boiling at 150° to 154° C. at 10 millimeters pressure) with potassium thiocyanate.

Beta-thiocyano-ethyl ether of 2-methyl-4-cyclohexyl phenol, a yellow liquid boiling at 210° to 220° C. at 6.3 millimeters pressure and having a specific gravity of 1.100 at 25°/4° C. This compound was prepared by reacting the beta-bromo-ethyl ether of 2-methyl-4-cyclohexyl phenol (boiling at 180° to 200° C. at 9 millimeters pressure) with potassium thiocyanate.

In a similar manner, the alkali metal thiocyanates may be reacted with other halo-alkyl ethers of alkylphenols to obtain the thiocyano-alkyl ethers of such phenols as 2-ethyl phenol, 3-isopropyl phenol, 4-secondary-butyl phenol, 4-normal-hexyl phenol, 3,5-dimethyl phenol, 2,4,6-trimethyl phenol, 2-methyl-4,6-di-isopropyl phenol, 4-tertiaryoctyl phenol, 2-cyclohexyl-4-tertiarybutyl phenol, 3-cyclohexyl-4-methyl phenol, and the like. The ether compounds which may be so prepared include beta-thiocyano-ethyl ethers, beta-thiocyano-propyl ethers, gamma-thiocyano-propyl ethers, gamma-thiocyano-isobutyl ethers, thiocyano-pentyl ethers, and the like.

The above thiocyano-alkyl ethers of the alkyl phenols are particularly valuable as insecticidal toxicants for inclusion in petroleum distillate type spray compositions. They are superior for this use over the thiocyano-alkyl ethers of phenol, for example, because of the greatly increased solubility of the ethers of the alkylphenols in such petroleum distillate fractions as kerosene and the like.

The compounds with which the present invention is particularly concerned are those having the formula $$R-O-C_nH_{2n}-SCN$$

wherein $n$ represents an integer from 2 to 5, inclusive, and R represents an alkylated phenyl radical containing at least 8 carbon atoms.

We claim:

1. A compound having the formula $$R-O-C_nH_{2n}-SCN$$

wherein $n$ represents an integer from 2 to 5, inclusive, and R represents an alkylated phenyl radical containing at least 8 carbon atoms.

2. A thiocyano-alkyl ether of an alkyl phenol wherein the sum of the carbon atoms in the alkyl groups attached to the benzene nucleus is at least 2.

3. A compound having the formula

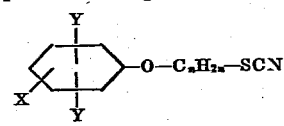

wherein $n$ is an integer from 2 to 5, inclusive, X represents an alkyl radical, and each Y represents a member of the group consisting of alkyl, cycloalkyl, and hydrogen, the sum of the carbon atoms in the X and Y groups being at least 2.

4. A compound having the formula

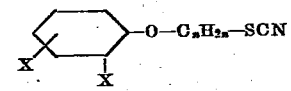

wherein $n$ is an integer from 2 to 5, inclusive, one X represents an alkyl radical, and the other X represents a member of the group consisting of alkyl, cycloalkyl, and hydrogen, the sum of the carbon atoms in the X groups being at least 2.

5. A compound having the formula

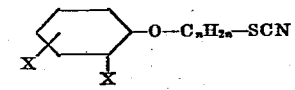

wherein $n$ is an integer from 2 to 5, inclusive, and each X represents an alkyl radical.

6. A compound having the formula

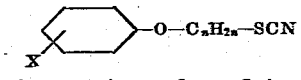

wherein $n$ is an integer from 2 to 5, inclusive, and X represents an alkyl group containing at least 2 carbon atoms.

7. A compound having the formula $$R-O-C_2H_4-SCN$$

wherein R represents an alkylated phenyl radical containing at least 8 carbon atoms.

8. A beta-thiocyano-ethyl ether of an alkyl phenol wherein the sum of the carbon atoms in the alkyl groups attached to the benzene nucleus is at least 2.

9. A compound having the formula

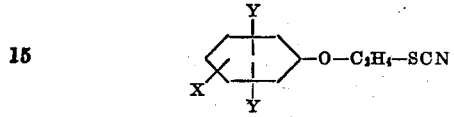

wherein X represents an alkyl radical and each Y represents a member of the group consisting of alkyl, cycloalkyl, and hydrogen, the sum of the carbon atoms in the X and Y groups being at least 2.

10. A compound having the formula

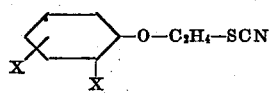

wherein one X represents an alkyl radical and the other X represents a member of the group consisting of alkyl, cycloalkyl, and hydrogen, the sum of the carbon atoms in the X groups being at least 2.

11. A compound having the formula

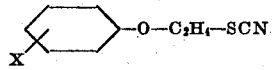

wherein X represents an alkyl group containing at least 2 carbon atoms.

12. Beta-thiocyano-ethyl ether of carvacrol.

13. Beta-thiocyano-ethyl ether of 4-tertiary-butyl phenol.

GERALD H. COLEMAN.
CLARENCE L. MOYLE.